Patented Oct. 6, 1953

2,654,717

UNITED STATES PATENT OFFICE 2,654,717

CURING POLYMERS OF MONOETHYLENIC ETHERS AND ETHER-ESTERS

Chessie E. Rehberg, Glenside, and Charles H. Fisher, Abington, Pa., assignors to the United States of America as represented by the Secretary of Agriculture No Drawing. Application October 29, 1948, Serial No. 57,404

11 Claims. (Cl. 260—23)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our copending application for patent, Serial No. 652,214, filed March 5, 1946, and granted as Patent No. 2,458,888.

This invention relates to synthetic polymeric materials and more particularly to a process for curing certain vinylic polymers.

In general, according to this invention, thermoplastic, organic solvent soluble polymeric products obtained by polymerization of monounsaturated vinylic monomers containing the group $CH_2=CH-$ or $CH_2=C(CH_3)-$ and containing in their molecule at least one oxygen atom linked to two carbon atoms (containing at least one ether linkage

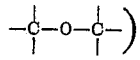

at least one of said carbon atoms being part of an aliphatic radical, are converted to non-thermoplastic solvent insoluble products by heating them for a sufficient length of time in the presence of free oxygen and the presence of an organic solvent-soluble metal salt of an organic acid as a catalyst. Certain salts of cobalt are preferred, but salts of nickel, manganese, zinc and lead which catalyze the drying of paint and varnishes are suitable.

The curing process of this invention is applicable to polymers of vinylic monomers containing a vinyl, acrylyl or methacrylyl radical. Polymers which can be rendered insoluble and infusible by our curing process are the thermoplastic polymerization products obtained by polymerization of monomeric vinyl ethers, for example, vinyl alkyl ethers like methyl, ethyl, n-butyl, isobutyl, sec-butyl or octyl vinyl ether; vinyl esters of alkoxy-carboxylic acids, like methoxy-, ethoxy-, propoxy- or butoxy-propionic acid and of the corresponding lower-alkoxy derivatives of other lower-hydroxy monocarboxylic acid like hydroxy butyric acid and the like; acrylic and methacrylic esters of heterocyclic ether-alcohols like tetrahydrofurfuryl acrylate and methacrylate; and monomeric compounds corresponding to the general formula

where R is hydrogen or methyl, $R^1$ is aryl, aralkyl or alkyl group and $n$ is 1 or 2. Suitable monomers corresponding to aforesaid general formula include for example the esters of acrylic and methacrylic acid derived from the phenyl, benzyl, phenethyl, chlorophenyl, xylyl, chlorobenzyl, methoxybenzyl and similar monoethers of ethylene glycol, diglycol, and those derived from the methyl, ethyl, butyl, isopropyl, isobutyl, 2-ethylbutyl, 2-ethylhexyl and similar alkyl monoethers of glycol or diglycols.

According to the process of this invention, the thermoplastic polymer formed by polymerization of any of aforementioned monomers, used either singly or in combination, and polymerized by any conventional polymerization procedure such as bulk, solution or emulsion polymerization, is heated in the presence of free oxygen, for example in contact with air at a temperature within the range of about 75° to 200° C., for a length of time sufficient to convert it to an infusible product which is insoluble in the common organic solvents such as aliphatic or aromatic hydrocarbon, esters, ethers, ketones and the like. This result is attained much more rapidly by conducting the curing process in the presence of a catalytic agent. Suitable catalysts include metallic salts which catalyze the drying of paint and varnishes. Salts of cobalt, nickel, manganese, zinc and lead which are soluble in organic solvents, for example, the organic acid salts of these metals like naphthenates and octoates, are suitable. Solvent soluble cobalt salts of organic acids and especially cobalt octoate and naphthenate are the most effective catalysts and are preferred.

The invention is described in greater detail as follows.

*Preparation of monomeric vinyl beta-ethoxypropionate.—*

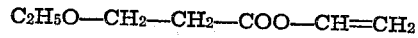

Beta-ethoxypropionic acid and vinyl acetate in a molar ratio of 1:4, to which was added mercuric acetate (1% of weight of vinyl acetate) and sulfuric acid (equivalent to the mercuric acetate) were refluxed for 3 hours. The catalyst was then neutralized with sodium acetate and the product distilled. Vinyl beta-ethoxypropionate was collected at 44° C./5 mm. and had $N_D^{20}$ 1.4165 and $d_4^{20}$ 0.9988.

*Polymerization in solution.—*25 g. of monomeric vinyl beta-ethoxypropionate as above produced, 75 g. of toluene and 0.25 of benzoyl peroxide were mixed and heated at 100° C. for 8 hours. The polymer was thus obtained as a sirupy solution. Upon evaporation of the solvent, the residue was a very soft, very tacky semiliquid resin.

*Bulk polymerization.*—20 g. of the monomeric vinyl beta-ethoxypropionate in which 0.2 g. of benzoyl peroxide had been dissolved was kept at 100° C. for several hours. It was then a viscous, sticky, semiliquid resin soluble in toluene.

Example I

*Curing of the polymer.*—Toluene solutions of polyvinyl beta-ethoxypropionate prepared as described above were used to prepare films on glass plates. Some of the films were made from solutions to which had been added cobalt octoate or cobalt naphthenate (about 0.02% of the weight of the polymer). The films were then baked in an oven at 110° C. The films containing cobalt cured within 30 minutes, as was shown by their change to a hard, glossy, tack-free, insoluble and infusible state. Those not containing cobalt underwent a comparable change only following heating at the same temperature for 48 hours.

Similar results were obtained on curing of other polymeric vinyl alkoxypropionates prepared and cured as described above, using in lieu of ethoxypropionic acid equivalent amount of other alkoxypropionic acids such as propoxypropionic or butoxypropionic acid.

Example II

*Curing of polyvinyl butyl ether.*—A sample of commercial polyvinyl butyl ether of relatively high molecular weight was dissolved in 20 times its weight of toluene. To a portion of this solution, an amount of cobalt octoate equal to about 0.02% of the weight of the polymer was added, and a film of the resin on glass was prepared. A similar film was prepared from the polymer solution containing no cobalt salt. After evaporation of the solvent, the plates were placed in an oven at 100° C. After two hours the film containing cobalt was tack-free (at 100° C.), while the other remained quite soft and tacky. After 24 hours at 100° C., the film containing cobalt was hard, glossy, transparent and altogether insoluble in toluene. The film not containing cobalt remained somewhat soft after 24 hours at 100° C. and became hard and glossy only following heating for 48 hours at 100° C. After being cured neither film was soluble in aliphatic or aromatic hydrocarbons, esters, ethers, ketones or other common organic solvents, nor did the cured films soften or melt when heated.

Identical results were obtained using cobalt naphthenate in place of cobalt octoate.

Other polyvinyl ethers, as for example, the methyl, ethyl, isobutyl, sec-butyl and octyl ethers are similarly cured.

Example III

*Curing of polymeric tetrahydrofurfuryl acrylate and methacrylate.*—Films of polymeric tetrahydrofurfuryl acrylate and methacrylate on wood, metal and glass panels, both with and without cobalt octoate or naphthenate were cured by baking at 100°–150° C. Those containing the cobalt salt were cured in 10 to 20 minutes while the others required 30 to 60 minutes. In all cases the cured films were clear, transparent, almost colorless, hard, glossy, insoluble, and infusible.

Example IV

*Curing of polymeric ethoxyethyl acrylate.*—Films of polymeric ethoxyethyl acrylate, some containing no catalyst, others containing benzoyl peroxide (5 percent by weight based on the polymer) or a few hundredths percent of cobalt (as naphthenate or octoate) were cured by heating at 100° C. The cobalt containing films were tack-free (at 100° C.) after heating for 10 minutes; those containing benzoyl peroxide required 15 minutes to convert them to a non-tacky condition. The films containing no catalyst were tack-free after heating for 60 minutes at 100° C. After being cured, the films were infusible and insoluble in organic solvents.

Panels of glass, wood, copper, brass and stainless steel were coated with polymeric resins formed by polymerization of the following monomers: methoxyethyl, butoxyethyl, methoxyethoxyethyl, ethoxyethoxyethyl, butoxyethoxyethyl and isopropoxyethyl acrylates, isopropoxyethyl methacrylate, 2-ethyl hexoxyethyl acrylate, 2-ethyl hexoxyethoxyethyl acrylate, phenoxyethoxyethyl acrylate, isopropoxyethoxyethyl acrylate.

The coatings were applied by dipping, spreading or brushing using solutions of the polymeric material in a suitable organic solvent, and on evaporation of the solvent the dry films were cured in an oven at temperatures from 75° to 150° C.

Rates of cure varied widely with different polymers temperatures and catalysts. The methacrylate cured slightly slower than the corresponding acrylate. The polymer containing aryl groups cured slower than the other. Those containing branched chain akyl groups cured faster than the comparable ones containing only straight chain alkyl groups. Incorporation of benzoyl peroxide (5 percent based on polymer) increased the rate of cure. A few hundredths percent of cobalt (as naphthenate or octoate) greatly accelerated the rate of cure and yielded harder films at lower temperature. With the latter catalyst, the more active polymers could be cured to the tack-free state in 10 minutes at 100° C. as compared to about 60 minutes required to attain the same result in the case of catalyst-free polymer films. In general, longer baking or higher temperature improved the hardness of the film.

All of the cured samples showed very good adhesion. Immersion of the cured specimens for 24 hours in water, alcohol, acetone, toluene, gasoline or ethyl acetate failed to loosen, dissolve or cloud the film or to render it tacky. Likewise, heating to 175° C. fails to make them tacky.

Instead of baking in an oven, the polymers may be cured by irradiation with ultra-violet or infra-red light, by electronic heating or by other known means.

Having thus described the invention, what is claimed is:

1. The process of producing infusible, insoluble polymeric products which comprises heating an organic solvent-soluble, thermoplastic polymer of a monoethylenic monomer selected from the group consisting of ethers and ether esters containing the terminal group $CH_2=CHR$— directly attached to a group from the class consisting of —O— and

said R being selected from the group consisting of H— and —CH₃, said monomeric compound being free from any polymerizable unsaturation other than that defined above, at a temperature of about 75° to 200° C. in the presence of free oxygen and of an organic solvent-soluble metal salt of an organic acid which catalyzes the drying of paint and varnishes as a reaction catalyst, said metal being selected from the group consisting of cobalt, nickel, manganese, zinc, and lead, the reactants above-identified being the sole reactants present.

2. The process of claim 1 wherein the metal is cobalt.

3. The process of claim 1 wherein the reaction catalyst is cobalt naphthenate.

4. The process of claim 1 wherein the reaction catalyst is cobalt octoate.

5. The process of claim 1 wherein the monomer is an alkyl vinyl ether.

6. The process of claim 1 wherein the monomer is n-butyl vinyl ether.

7. The process of claim 1 wherein the monomer is an acrylic acid ester of an alkyl monoether of a glycol.

8. The process of claim 1 wherein the monomer is an acrylic acid ester of the isopropyl monoether of a glycol.

9. The process of claim 1 wherein the monomer is the acrylic acid ester of tetrahydrofurfuryl alcohol.

10. The process of claim 1 wherein the monomer is the methacrylic acid ester of tetrahydrofurfuryl alcohol.

11. The process of claim 1 wherein the monomer is vinyl beta-ethoxypropionate.

CHESSIE E. REHBERG.
CHARLES H. FISHER.

References Cited in the file of this patent
UNITED STATES PATENTS

| Number | Name | Date |
|---|---|---|
| 2,129,666 | Barrett et al. | Sept. 13, 1938 |
| 2,143,721 | Sweet | Jan. 10, 1939 |
| 2,155,590 | Garvey | Apr. 25, 1939 |
| 2,189,529 | Carothers et al. | Feb. 6, 1940 |
| 2,442,330 | Fuller | June 1, 1948 |
| 2,476,922 | Shokal et al. | July 19, 1949 |
| 2,491,409 | Kropa et al. | Dec. 13, 1949 |
| 2,527,853 | Roach et al. | Oct. 31, 1950 |